May 24, 1960
C. A. COYLE
2,937,631
HIGH EFFICIENCY INTERNAL COMBUSTION ENGINE
Filed April 18, 1956
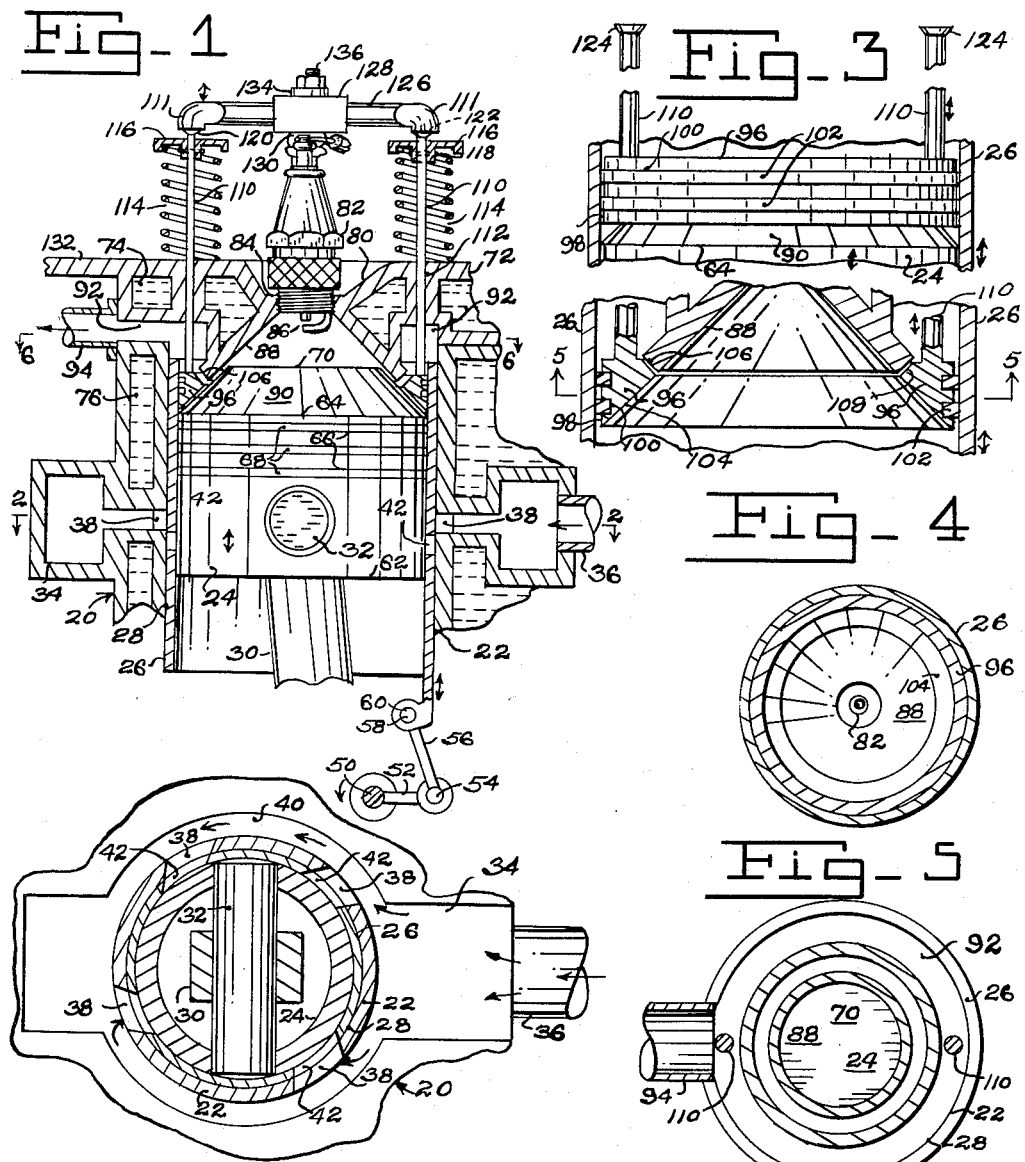
INVENTOR.
Charles A. Coyle
BY
Peter Fries, Jr.
ATTORNEY

United States Patent Office 2,937,631
Patented May 24, 1960

2,937,631

HIGH EFFICIENCY INTERNAL COMBUSTION ENGINE

Charles A. Coyle, 808 High St., Port Jefferson, N.Y.

Filed Apr. 18, 1956, Ser. No. 578,984

5 Claims. (Cl. 123—75)

This invention relates to improvements in piston type engines.

An object of the invention is to provide a novel and improved piston type engine in which there is an exhaust valve constructed in the form of a hollow frusto-cone, cooperating with a hollow conical cylinder head, with means for moving the exhaust valve into and out of closing seating engagement with the cylinder head exhaust valve port.

Another object of the invention is to provide a novel and improved uniflow type internal combustion engine, with an axially slidable sleeve type intake valve inside which the piston is slidable, and a hollow frusto-conical exhaust valve at the top of the cylinder, the piston having its upper end frusto conical in contour to conform to the conical dome or cylinder head, and the exhaust valve being vertically reciprocable into and out of seating engagement with the exhaust valve seat formed on the undersurface of the cylinder head.

A further object of the invention is to provide a novel and improved uniflow type internal combustion engine in which there is a hollow frusto-conical cylinder head or dome with an exhaust valve seat formed on its lower edge, there being a hollow frusto-conical slidable exhaust valve seated on said valve seat when in closed position, and movable vertically downwardly therefrom to open the exhaust valve, one or more exhaust valve actuating stems extending out of the exhaust valve through the cylinder head for being periodically actuated by mechanical valve opening and closing means during the engine cycle, the piston being upwardly frusto-conical to interfit with the hollow exhaust valve and cylinder head when at the top of its stroke, and thus tending to constrain the exhaust valve into tight seating engagement with the cylinder head, and in which there is a slidable sleeve in which the piston is movable, the sleeve having communicating ports formed therein which, when in registry with the intake manifold ports, allow fuel-air mixture to then enter the cylinder when the piston is retracted below the intake ports.

Still another object of the invention is to provide a novel and improved internal combustion engine in which there is a symmetrical conical combustion chamber with ignition at the apex of the cone, large area valve openings, and a construction such that there is a nearly constant cylinder vacuum for a major portion of the intake stroke, thus providing good engine operating characteristics and high efficiency.

Still a further object of the invention is to provide a novel and improved uniflow type internal combustion engine of the character described, in which there is means for cooling the exhaust clearance gases before mixing with the fresh charge, thus increasing the amount of work secured from the heat absorbed, and eliminating the tendency to pre-burning of the fresh charge, with the further advantage of preventing any flame propagation into the carburetor due to such after-burning and hence avoiding the consequent fire hazard.

Another object of the invention is to provide an internal combustion engine of the character described, in which, with four cycle operation there is the advantage of unequal strokes of the piston, so that expansion stroke is greater than compression stroke, with increased efficiency as a consequence.

These and other objects and advantages of the invention will become apparent from the following description of a preferred embodiment thereof, as illustrated in the accompanying drawings, forming a part hereof, and in which, Figure 1 is a sectional elevational view taken through a cylinder of the engine, showing the piston in an upper position relative to the cylinder head, near the top of its stroke, the clearances being exaggerated somewhat for clarity of illustration.

Figure 2 is a sectional plan view taken substantially at plane 2—2 of Figure 1, in fragment.

Figure 3 is a sectional elevational detail view of the middle portion of the device of Figure 1, but showing the upper portion of the intake valve sleeve in section, but the exhaust valve unsectioned, the upper portion of the piston also being shown in the view.

Figure 4 is a sectional elevational detail view similar to the middle portion of Figure 1, but on a larger scale, showing the intake valve sleeve in fragment, the exhaust valve and cylinder head being shown in section, the view being taken just before seating of the exhaust valve on its seat, with the clearance being exaggerated for clarity of illustration.

Figure 5 is a sectional plan view taken substantially on plane 5—5 of Figure 4.

Figure 6 is a sectional plan view taken substantially on plane 6—6 of Figure 1, in fragment.

Internal combustion engines depend to a major extent on compression ratios for efficiency, and to a lesser extent on friction loss. To utilize high compression ratios in an actual engine requires a combustion chamber of such a shape and with ignition at a point which will approximate flame propagation toward the surface of sphere. Short stroke engines with the stroke less than the bore diameter will show friction loss advantages.

Combining high compression and short stroke results in a relatively small clearance volume, which presents design difficulty to retain the desired shape of the combustion chamber and provide a valve area which will be sufficient for free breathing of the engine in operation. Four cycle engines using carburetors or variable load control devices which measure both fuel and air will operate at different inner vacuums, which presents lubrication difficulty of the top section of the cylinder. Providing sufficient cylinder wall lubrication at full load will result in over-lubrication at light load. Thus a compromise becomes necessary, in which under-lubrication of the top cylinder section results at more than light or medium loads.

When exhaust clearance gases of high temperature are mixed with the fresh charge, their temperature will equalize in approximately one-millionth of a second, but if not thoroughly mixed, heat transfer is much slower. During variable load operating conditions, present engines do not always secure homogeneous mixtures of exhaust clearance gas and fresh charge with the result of partial ignition of fresh charge from the high temperature exhaust clearance gases. This preburning of the fresh charge results in efficiency loss. The present invention has as a further object the elimination of these aforementioned causes of efficiency loss.

In the present construction, a symmetrical conical combustion chamber is provided, with ignition at the apex of the cone, there being a frusto-conical exhaust valve disposed below the combustion chamber, and slidable upwardly to seat thereon, thus giving an extra large circular valve opening for the exhaust gases, and assuring absence of restriction of gas flow. Further, the valve closing motion is in the same direction as the piston motion, and the conical upper end of the piston will close a sticking valve without damage to the engine parts. The minimum clearance volume may be any amount desired, without requiring any change in valve design. The engine breathing is uniflow, that is, intake at the inner or lower dead center of the piston travel, and exhaust at the outer or upper dead center of piston travel. The actual intake valve opening and closing is by the piston movement past the intake valve ports, thus giving a sharp cut-off, and no wire drawing effect. The extra expansion of the clearance volume following exhaust, secures extra work, cools the clearance gas, and reducing after-burning during the intake and compression strokes, resulting in reduced negative work and increasing the usable compression ratio for a given fuel octane rating.

In order to understand further the nature of the invention, reference may now be had to the drawings, in which like numerals denote similar parts throughout the several views.

As shown, there is a cylinder block 20, with one or more cylinders 22 formed therein, for the reception of the axially slidable pistons 24. Hollow cylindrical valve sleeves 26 are disposed in the cylinder bores 28, being arranged therein for vertical sliding motion. Thus each piston 24 is slidable axially in the cylindrical valve sleeve 26, which in turn is slidable axially in the bore of the cylinder 22.

Connecting rods 30 have their upper ends extending inside the downwardly hollow pistons 24, being pivotally secured therein by wrist pins 32. The lower ends of the connecting rods 30 are pivotally connected to the crank shaft of the engine, not shown, in any well known manner, so that as the crank shaft turns the piston moves up and down reciprocating in the cylinder, and, when the piston is driven in its working stroke, then it turns the crank shaft to do useful work. An intake manifold generally indicated at 34 is connected by delivery pipe 36 to a source of fuel-air mixture, such as a carburetor, etc., and has intake ports 38 extending through the walls of the cylinder 22, for conducting the explosive air-fuel mixture into the cylinder for combustion therein. The air-fuel mixture thus is fed from the carburetor through delivery pipe 36, into the main manifold passageways 34, and galleries 40, to the intake ports 38 through the cylinder walls of the cylinder 22.

In order to allow for passage of the fuel-air mixture into the cylinder when the piston is lowered, a set of valve intake ports are shown at 42, being formed through the cylindrical sleeve valve 26 and disposed in axial alignment for registry with the intake ports 38 in the cylinder wall, when the sleeve valve 26 is at the registering level, that is, at a level when its ports 42 are at the same level as the ports 38 in the cylinder wall. The air-fuel mixture thus at such time, will have free access for entry into the cylinder when the piston 24 has moved to a lower level to unblock the sleeve valve ports 42. To give a better mixture in the cylinder, it is preferred to angulate the intake ports 42 and 38 as shown, so that the mixture is sucked into the cylinder with some turbulence and rotational motion, for better efficiency.

To move the sleeve valve 26 up and down in the engine cycle, I provide a rotatable shaft 50, shown in Figure 1 schematically, with a crank 52 pivotally connected at pin 54 to a connecting rod 56 the outer end of which is pinned at 58 to the boss or stud 60 mounted on and movable with the lower end of the sleeve valve 26. It is seen that turning of the shaft 50 by any suitable means, as by coupling the same to the engine rotating parts, will cause the sleeve valve 26 to reciprocate up and down at any desired speed and cycle timing as desired and adjusted for.

As seen in Figure 1, the major portion of the piston outer surface, from its lower edge 62 to its upper location 64 is cylindrical, with several annular grooves at 66 to receive the piston rings 68 in the well known manner to seal against gas leakage past the rings. However, above location 64, I prefer to make the contour of the piston frusto-conical, up to the flat top 70, the piston being of course closed on top. It is seen that the engine has a cylinder head 72, which may be hollowed out as at 74 to form a water jacket, as the cylinder block is hollowed out at 76, forming a water jacket also, through which cooling water may be pumped by a mechanical pump or the like.

The upper surface of the cylinder head 72 may be depressed as at 80 to receive the spark plug 82, which is threaded into the opening 84, so that its active electrodes 86 extend into the frusto-conical combustion chamber 88. It is seen that the frusto-conical upper end portion 90 of the piston conforms to the conical curvature of the combustion chamber 88, as the piston extends inside the combustion chamber. An exhaust manifold is shown at 92, so that the hot exhaust gases from the cylinder, may be exhausted to atmosphere through the exhaust pipe 94, through a suitable muffler to deaden or damp out the sound somewhat. An exhaust valve is shown at 96, the valve being circular and annular in shape, with cylindrical side walls 98 which are movable slidably inside the bore of the intake valve sleeve 26, axially, there being preferably annular grooves 100 formed in the walls 98 to receive sealing rings 102 to maintain sealing against leakage of gases therepast in the manner of piston sealing rings.

As shown, the inner surface 104 of the exhaust valve 96 is also frusto-conical to conform to the conical contour of the inside surface 88 of the cylinder head combustion chamber 88, in the manner shown best in Figure 4. As the lower edge 106 of the cylinder head combustion chamber 88 extends everywhere at right angles substantially, to the surface 88, and thus forms an exhaust valve seat for the exhaust valve 96, it is apparent that the upper surface 108 of the exhaust valve must also conform to such shaping of the valve seat 106. Thus, it is seen that when the exhaust valve 96 is moved upwardly, its seating surface 108 will seat nicely and snugly upon the valve seat surface 106 of the conical cylinder head combustion chamber. While the contours shown for the valve seating surfaces are preferred, it will be understood that I do not desire to be limited to them precisely, and that other angulations may be employed according to modified forms of the invention, and also that an annular rib and mating groove may be formed complementarily in the seating surfaces to further enhance sealing when considered necessary, so that the rib would enter the groove when the parts are in seating engagement.

In order to raise and lower the exhaust valve, I prefer to employ means such as the valve stems 110, which may be secured to or integral with the exhaust valve, and extend from opposite sides of the valve upwardly through the bores 112 formed through the cylinder head in any convenient manner for this purpose. Springs 114 may be provided under the washers 116 which washers in turn are secured to the valve stems 110 as by pins 118 or the like. The arrangement is thus such that the springs exert upward bias on the washers and hence on the valve stems 110, the lower ends of the springs sitting on the top of the cylinder head or in cups provided for that purpose in any well known manner. As a result, the springs 114 exert upward bias to keep the exhaust valve 96 normally in closed seated position against the valve seat 106 of the cylinder head combustion chamber. Further, it is seen that the upward motion of the conical portion of the piston 24 will further push the exhaust valve upwardly into good seating engagement with seat 106.

In order to open the exhaust valve by depressing it from seating against seat 106, I provide pusher arms 111 having recesses or sockets 122 formed in their under surfaces to receive the upper ends 124 of the valve stems 110. The arms 111 extend rearwardly as seen in Figure 1, to integrate with the yoke shaft 126, which is journaled in bearing housing 128 carried on a post 130 supported on the cylinder head top surface 132 and secured thereto by screws or the like. A rearwardly extending lever arm 134 forms a rocker arm penetrated by the upper end 136 of the valve actuating rod ultimately riding on the camshaft of the engine, so as to rock the arms 111 up and down to alternately depress and elevate the exhaust valve 96 during the engine cycle as predetermined by the mechanical linkages and needs, timing, etc.

The cycle of operation of the engine may now be considered, it being understood that the spark plug 82 is connected by wires to a suitable source of timed spark, such as an induction coil with cyclically interrupted primary current to induce high voltage across the secondary which is connected to the spark plug.

*Fuel intake stroke.*—The exhaust valve is closed, the piston being at the top of its stroke and commencing to move downwards. The intake valve sleeve 26 moves upwardly so its intake valve ports 42 are brought into registry with the intake manifold ports 38. As the piston continues to move downwards, its edge 64 passes downwards to come below or just even with the bottom edges of the now aligned registered ports 42 and 38, the motion of the piston on this intake stroke having drawn a vacuum inside the cylinder above the piston, as the exhaust valve is closed. The fuel-air mixture or charge is drawn into the cylinder from duct 36, and then the piston starts its upward compression stroke.

*Compression stroke.*—Exhaust valve is closed. Piston edge 64 moves upwardly past the registered ports 42 and 38, blocking further fuel-air intake, there being a sharp cut-off by the motion of the piston. Then while the piston continues its upward compression stroke, the valve sleeve 26 moves out of registry of its intake ports 42 with the intake manifold ports 38, such as downwardly. The piston reaches the top of its compression stroke, compressing the fuel-air mixture in the space just below the spark plug in the conical combustion chamber 88.

*Power stroke.*—Having reached the top of its compression stroke, the spark plug fires, igniting the compressed mixture, and producing high pressure gases pushing the piston downwards on its power stroke, the intake sleeve valve ports 42 remain below the intake manifold ports 38 as shown in Figure 1, so that the downward travel of the piston on the power stroke does not uncover the intake valves or bring them into registry, since the sleeve valve ports 42 do not uncover the intake manifold ports 38.

*Exhaust stroke.*—The piston starts its upward travel, and the exhaust valve opens by downward movement of the push rods 110 by the levers 126 as a consequence of the upward push on the rear push rods 136 similar to the valve opening motion in an overhead valve poppet type engine, overcoming the closing bias of the springs 114. As the piston moves upwardly, it pushes or scavenges out the burned fuel-air gases, etc., through the open exhaust valve 96, which is unseated from its seat 106 by movement of valve edge 108 away from seat 106 as seen best in Figure 4. Figure 4 shows only a partial opening position of the valve, it being understood that by moving the valve 96 down, a considerably greater valve opening is possible. The burned gases being pushed out by the upwardly moving piston, it is seen that when the piston is reaching the top of its exhaust stroke, it is time to close the exhaust valve 96 by allowing its springs 114 to pull it up onto its seat 106 again. It is also seen that the construction is such, that as the piston continues upwardly, it pushes the exhaust valve 96 upwardly onto its seat, so that there is no possibility of the exhaust valve sticking in open position.

It is seen that the actual opening and closing of the fuel-air intake to the cylinder is by movement of the engine piston, and hence a rapid cut off results, with the advantage that wire draw effect from restricted intake is eliminated, and turbulence is increased for greater efficiency. In the preferred cycle, the relative motion of the piston and sleeve 26 may be stated as follows: (1) Piston at top of stroke, sleeve at mid-way of upward stroke. At the start of intake stroke, piston moves down while sleeve moves up. (2) Piston at bottom of stroke, and sleeve at top. Cylinder and sleeve ports are in line with start of compression. (3) Piston at top, sleeve at mid-stroke moving down, intake closed, start of power stroke. (4) Piston at bottom, sleeve at bottom, sleeve and piston starting to move up, start of exhaust stroke. (5) Same as (1), piston at top, sleeve at mid-stroke moving up. Start of clearance, expansion and intake stroke, top of sleeve ports are at or in line with bottom of cylinder ports. It is also understood that variations in the timing and strokes are possible since the means for such variation are provided to suit individual conditions desired.

The compression ratio will not secure full efficiency unless there is also a suitable expansion ratio. For example, an engine with a compression ratio of 9 to 1 and expansion ratio of 6 to 1 would not show as good efficiency as one with a compression ratio of 9 to 1 and an expansion ratio of 9 to 1. Also, an engine would be still better if the expansion ratio were greater than the compression ratio. In general the Otto cycle is considered to have a disadvantage in that strokes are considered equal, that is, compression ratio and expansion.

The expansion ratio actually in an engine is at the moment of release—the volume above the piston when the exhaust valve starts to open—and the actual compression ratio is the volume above the piston when intake valve closes. To secure high power output, present engines use intake valves considerably larger than exhaust valves, also because present prior art exhaust valves would not cool as easily as intake valves. Thus the exhaust valve must open early in the lower half of the power stroke to prevent back pressure against the piston on the exhaust stroke.

In the present construction shown herein, both my valves have a much larger area opening for a given cylinder bore. In my engine, I may open the exhaust valve later and close the intake valve earlier, with the result that the expansion ratio and compression ratio will be greater actually than with prior art engines with the same assumed compression ratio. Also, the intake being a sharp cut-off, the actual point of start of compression has no uncertainty. With my valves, therefore, a practical engine can have the exhaust opening nearer bottom center than the intake closing, resulting in a cycle with unequal strokes. This gives an efficiency comparable to the Atkinson cycle, which was never proved to be a practical design, and an expansion ratio greater than a compression ratio.

The feature of unequal strokes is of importance. It is due to the situation where there is a large area of exhaust valve opening, so that it is not necessary to start opening the exhaust valve as early during the exhaust stroke as is necessary in conventional engines. Thus the stroke from intake valve closing to top center during compression, is less or shorter than the piston motion during the power stroke from top center to the point at which the exhaust valve starts to open. Conventional engines with smaller exhaust valves require earlier opening of exhaust valve to avoid back pressure against the piston during exhaust.

My exhaust valve as shown, moving the outer contact area, lends itself to easy adaptability for other forms of combustion chamber according to a modified form of the invention, so that I do not wish to be limited especially to the conical shape shown, that being a preferred form. Although I have shown a specific construction, I do not desire to be limited thereto, as it is understood that various changes may be made in size, shape, materials and arrangement without departing from the spirit and scope of the invention as claimed. According to another modified form, the piston could be flat top rather than frusto-conical.

I claim:

1. An engine comprising a cylinder, sleeve means slidable in said cylinder, piston means slidably in said sleeve means, intake valve port forming means defining intake valve ports in said cylinder, sleeve valve port forming means defining sleeve intake valve ports in said sleeve, means constructed and arranged for moving said sleeve to bring its said sleeve valve ports into registry with said cylinder intake valve ports to admit fuel into said cylinder when unblocked by said piston means, cylinder head means at the head end of said cylinder and defining a combustion chamber, ignition means at said combustion chamber for igniting a charge, and exhaust valve means at said cylinder head means for opening to exhaust burned gases from said cylinder, and characterized further in that said cylinder head means is constructed and arranged to define a conical combustion chamber with an exhaust valve seat formed at one end of said chamber, and wherein said exhaust valve means comprises conical wall surfaces and a valve seat formed at one end of said exhaust valve for engagement with said exhaust valve seat on said cylinder head means, and actuating means constructed and arranged for moving said exhaust valve into and out of seating engagement with said valve seat on said cylinder, and for piston reinforced seating engagement on the piston upstroke.

2. The construction according to claim 1, characterized further in that said exhaust valve means comprises a cylindrical outer wall slidable along the interior of said sleeve means, and an exhaust valve seat on an upper end of said exhaust valve means, and constructed and arranged for seating engagement with said cylinder head means, so that to open said exhaust valve said valve is moved away from said cylinder head and out of said seating engagement therewith, and to close said exhaust valve said valve is moved toward said cylinder head and into seating engagement therewith, said actuating means being constructed and arranged for moving said exhaust valve from open to piston reinforced closed positions and vice versa.

3. The construction according to claim 1, characterized further in that said cylinder head means comprises a conical combustion chamber with a valve seat formed at one end thereof, and wherein said exhaust valve means comprises an annular conical valve body, and defining a valve seat at one end of said conical valve body for seating engagement with said cylinder head combustion chamber valve seat, so that when said exhaust valve is moved axially toward said cylinder head seat, it is moved to closed valve engagement therewith, and when moved axially away from said seat, it is moved to open exhaust valve disposition relative thereto, said actuating means being constructed and arranged for moving said exhaust valve between open and piston reinforced closed valve positions.

4. The construction according to claim 1, wherein said piston means comprises a piston body formed with cylindrical lower body portion, and a frusto-conical upper portion near the cylinder head end thereof, said conical upper portion being conformable substantially to the interior shape of said cylinder head combustion chamber and said exhaust valve means.

5. The construction according to claim 1, wherein said combustion chamber is formed with conical side surfaces and defining a valve seat at the lower portion thereof, and wherein said exhaust valve means is formed with conical side surfaces and forming, when in engaged valve closed position, a prolongation of the conical surface of said combustion chamber, said valve means having a seat formed in its upper surface for engagement with said combustion chamber valve seat when moved into contact therewith, said exhaust valve means being constructed and arranged so that upward motion of said piston biases said exhaust valve into piston reinforced closed seating engagement therewith.

References Cited in the file of this patent

UNITED STATES PATENTS

| 1,121,131 | Redrup | Dec. 15, 1914 |
|---|---|---|
| 1,164,549 | Riker | Dec. 14, 1915 |
| 1,165,324 | Curtis | Dec. 21, 1915 |
| 1,253,630 | Riker | Jan. 15, 1918 |
| 1,563,392 | Osborn | Dec. 1, 1925 |
| 1,601,274 | Warrington | Sept. 28, 1926 |
| 1,610,888 | Sauer | Dec. 14, 1926 |
| 1,734,345 | Recen | Nov. 5, 1929 |
| 1,757,907 | Jameson et al. | May 6, 1930 |
| 2,706,470 | Sills | Apr. 19, 1955 |

FOREIGN PATENTS

| 491,320 | France | Jan. 30, 1919 |
| 204,747 | Great Britain | Sept. 26, 1923 |